United States Patent [19]

Karakolev et al.

[11] Patent Number: 4,727,714
[45] Date of Patent: Mar. 1, 1988

[54] TOMATO PICKING MACHINE

[75] Inventors: Djenjo P. Karakolev; Milko Y. Stoyanov; Zapryan G. Zapryanov; Pavel N. Tontchev, all of Plovdiv; Ivan V. Vaklinov, Stambolii; Hristo A. Simitchiev; Marin P. Tchernev, both of Plovdiv, all of Bulgaria

[73] Assignee: NPSK "G. Dimitrov", Plovdiv, Bulgaria

[21] Appl. No.: 924,238

[22] Filed: Oct. 28, 1986

Related U.S. Application Data

[63] Continuation-in-part of Ser. No. 685,297, Dec. 24, 1984, abandoned.

[30] Foreign Application Priority Data

Dec. 22, 1983 [BG] Bulgaria .................................. 63532

[51] Int. Cl.⁴ .............................................. A01D 45/00
[52] U.S. Cl. ...................................... 56/327.1; 171/14
[58] Field of Search ............... 56/327 R, 364; 171/14, 171/27, 127

[56] References Cited

U.S. PATENT DOCUMENTS

| | | | |
|---|---|---|---|
| 4,189,906 | 2/1980 | Cooper | 56/327 R |
| 4,234,045 | 11/1980 | Porter | 56/327 R |
| 4,365,463 | 12/1982 | Bettencourt et al. | 56/327 R |
| 4,392,533 | 7/1983 | Bittle | 56/327 R |
| 4,426,832 | 1/1984 | Porter | 56/327 R |

Primary Examiner—John J. Wilson

[57] ABSTRACT

A tomato picking machine has a ground level copying device comprising a separate frame articulately fastened to an inclined conveyor which is mounted to the front of the main machine frame. A cutting device is situated above the ground level copying device and is fastened to the lower part of the inclined vibrating conveyor. A tomato separator is placed above the highest part of the inclined vibrating conveyor. Under the tomato separator is a waste product cleaning conveyor which connects with crosswise separating conveyors whose outer ends lie above lengthwise conveyors. A picker with articulately mounted spikes is mounted in front of a short receiving conveyor. The receiving conveyor is mounted in front of the vibrating conveyor and parallel to it. The inclined vibrating conveyor and cleaning conveyor are made of endless chains. The cleaning conveyor has smooth tube type rollers which are mounted by bearings onto pilots rigidly fastened to the endless chains. Tube type supports of the inclined vibrating conveyor are blocked from rotation. The speed of the short receiving conveyor is greater than the speed of the picker.

1 Claim, 7 Drawing Figures

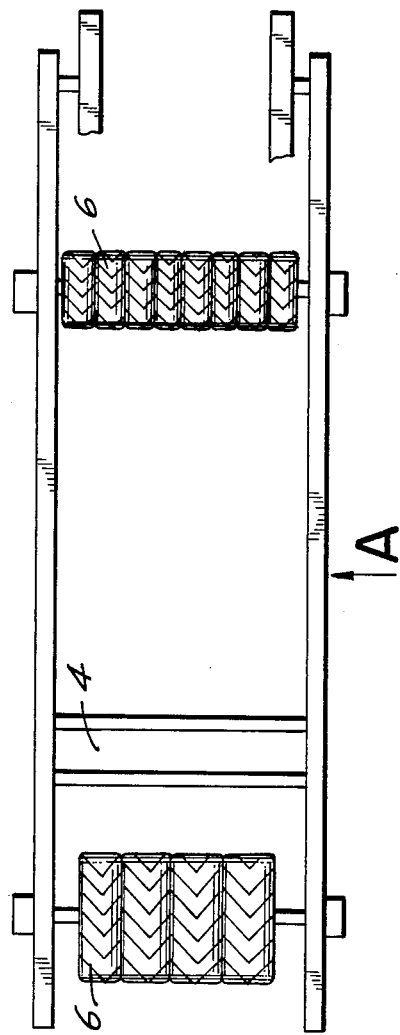
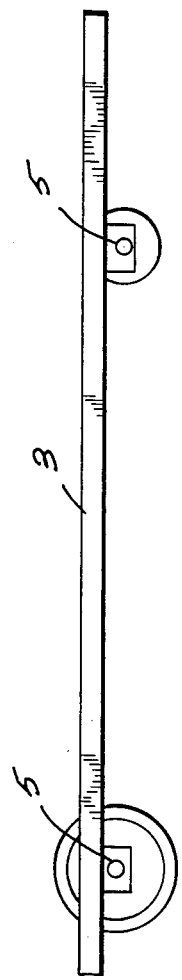
FIG. 3
FIG. 4

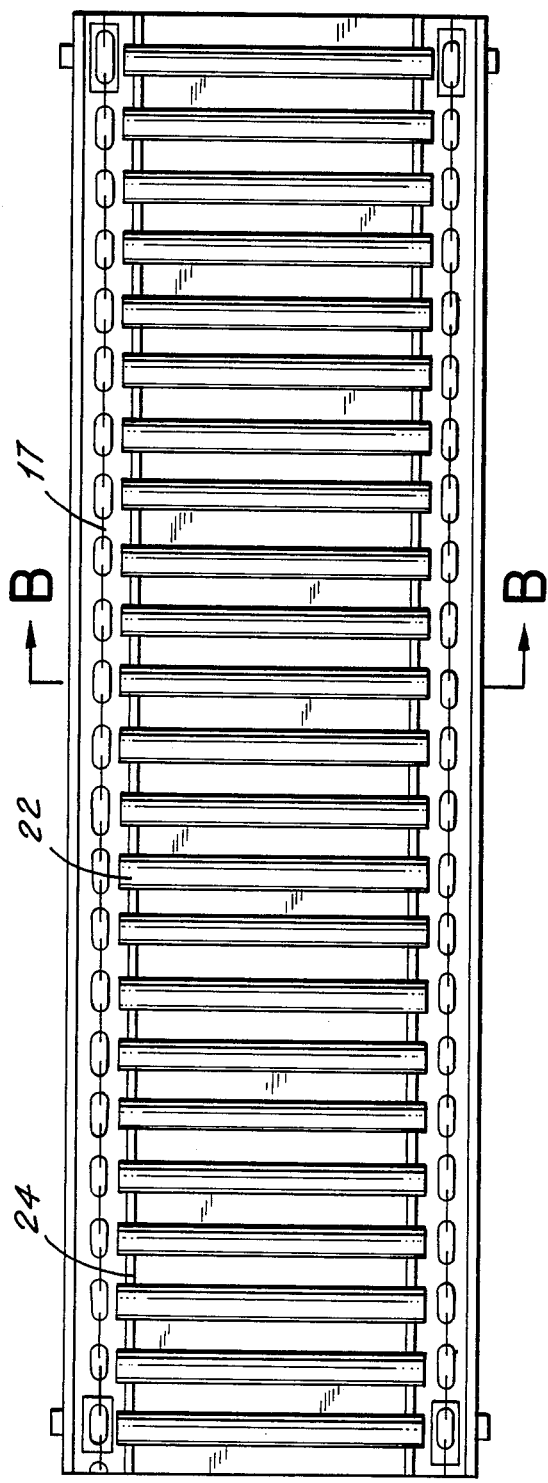
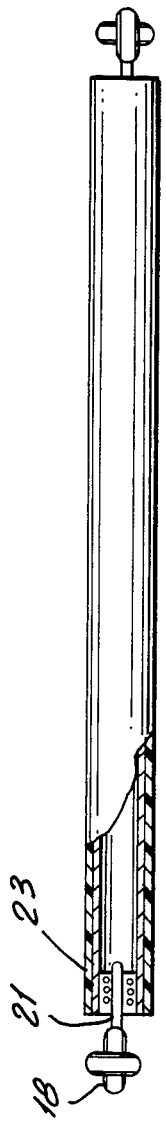
FIG. 6
FIG. 7

TOMATO PICKING MACHINE

This application is a continuation-in-part of Applicant's copending application, Ser. No. 685,297, filed Dec. 24, 1984, now abandoned.

BACKGROUND OF THE INVENTION

The invention relates to a machine used for picking tomatoes for further processing as well as for direct consumption.

A known tomato picking machine consists of a support frame, an articulated inclined vibrating conveyor fastened to its front part, and a tomato selector with planks placed above the conveyor. In front of the lower end of the inclined vibrating conveyor, a cutting disc device is placed with a ground level copying device positioned under it. A tomato separator is situated under the upper part of the inclined vibrating conveyor and a waste product cleaning conveyor is mounted under it. Across the machine are placed separating belt conveyors connected with a waste product cleaning conveyor at one end and a lengthwise belt conveyor at the other end. The lengthwise conveyor is joined with a crosswise picking conveyor and a side moving rake conveyor, these two being placed in succession. The support wheels of the ground level copying device touch the bottom of the furrows between every two neighboring beds. See, e.g., U.S. Pat. Nos. 4,189,906, 4,365,461; 4,365,463; and 4,426,832. See also U.S. Pat. No. 4,234,045 which the inventors believe to be the closest prior art.

A drawback of known tomato pickers is that the gathering of tomatoes also involves the gathering of a great quantity of earth due to the cutting disc device used. The cutting disc device cannot prevent lumps of earth of considerable size from falling on the inclined vibrating conveyor when stems are being cut. The ground level copying at the bottom of the beds also contributes to this unsatisfactory feature of existing tomato picking machines. The belt conveyors used in picking technology are not an impediment to the earth impurities nor to the squashed or rotten tomatoes. Another disadvantage of the known technology is the constructive inadequacy of the picker in a field of abundant plants and weeds since its planks are rigidly fastened.

SUMMARY OF THE INVENTION

It is therefore an object of the present invention to create a tomato picking machine which separates earth impurities, squashed and rotten tomatoes from the quantity gathered and which can work reliably regardless of the thickness of plantation.

The present invention comprises an articulately inclined vibrating conveyor fastened to the front part of a support frame and a ground level copying device placed below the conveyor. A picker is fastened above the front part of the inclined vibrating conveyor. A cutting device is placed in front of the picker. A tomato separator is placed below the upper part of the inclined vibrating conveyor. A waste product cleaning conveyor is mounted under the separator, said conveyor being operatively connected with separating conveyors placed crosswise to the machine. The outer ends of the separating conveyors lie above lengthwise conveyors placed on both sides of the machine and joined with a side moving rake conveyor and crosswise picking conveyor placed in succession.

According to the invention, the picker has spikes articulately mounted so that they can turn in only one direction. A short receiving conveyor is mounted parallel to the inclined vibrating conveyor between the inclined vibrating conveyor and the spikes. The ground level copying device is placed behind the cutting device and lies on the processed bed. The inclined vibrating conveyor and the waste product cleaning conveyor are made of endless chains mounted lengthwise to the machine and connected crosswise with tube type supports and smooth tube type rollers respectively. The lengthwise conveyors, the separating conveyors and the crosswise picking conveyor are of the belt and self-cleaning type. The cutting device is a vibrating one which has two comb-like blades placed perpendicular to the longitudinal axis of the machine.

The ground level copying device, which centers the inclined frame and the blades toward the working surface, comprises an additional frame fastened to the lower end of the inclined vibrating conveyor. The front part of the frame is articulately mounted while its back part is fastened by means of hydrocylinders. Two axes placed crosswise to the bed are mounted to the additional frame by means of bearings, and above said axes self cleaning wheels are mounted closely to one another.

The tube type supports of the inclined vibrating conveyor are immovably blocked (so that they cannot rotate) by means of planks which are rigidly fastened to the horizontal loops of the endless chains and whose narrow ends freely enter the tube type supports.

The smooth tube type rollers of the waste product cleaning conveyor are mounted by means of bearings on pilots. The pilots are rigidly fastened to the horizontal loops of the endless chains.

The machine has been constructed in such a way that the forward motion of the short receiving conveyor has a speed of two to three times greater than the speed of the picker.

The advantages of the tomato picking machine of the present invention are that the gathered amount has a minimum of earth impurities or squashed tomatoes. This is achieved by means of the ground level copying device which is placed above the surface of the processed bed and also by cleaning of the impurities during the process of picking.

The machine is also capable of picking fields of abundant plantations including many weeds without the drawback of clogging.

BRIEF DESCRIPTION OF THE DRAWINGS

With these and other objects in view, which will become apparent in the following detailed description, the present invention, which is shown by example only, will be clearly understood in connection with the accompanying drawing, in which:

FIG. 3 is a top view of the ground level copying device;

FIG. 4 is a side view of the ground level copying device;

FIG. 6 is a top view of the waste product cleaning conveyor; and

FIG. 7 is a cross-section along line B—B of FIG. 6.

DETAILED DESCRIPTION OF THE DRAWINGS

Figure 1:
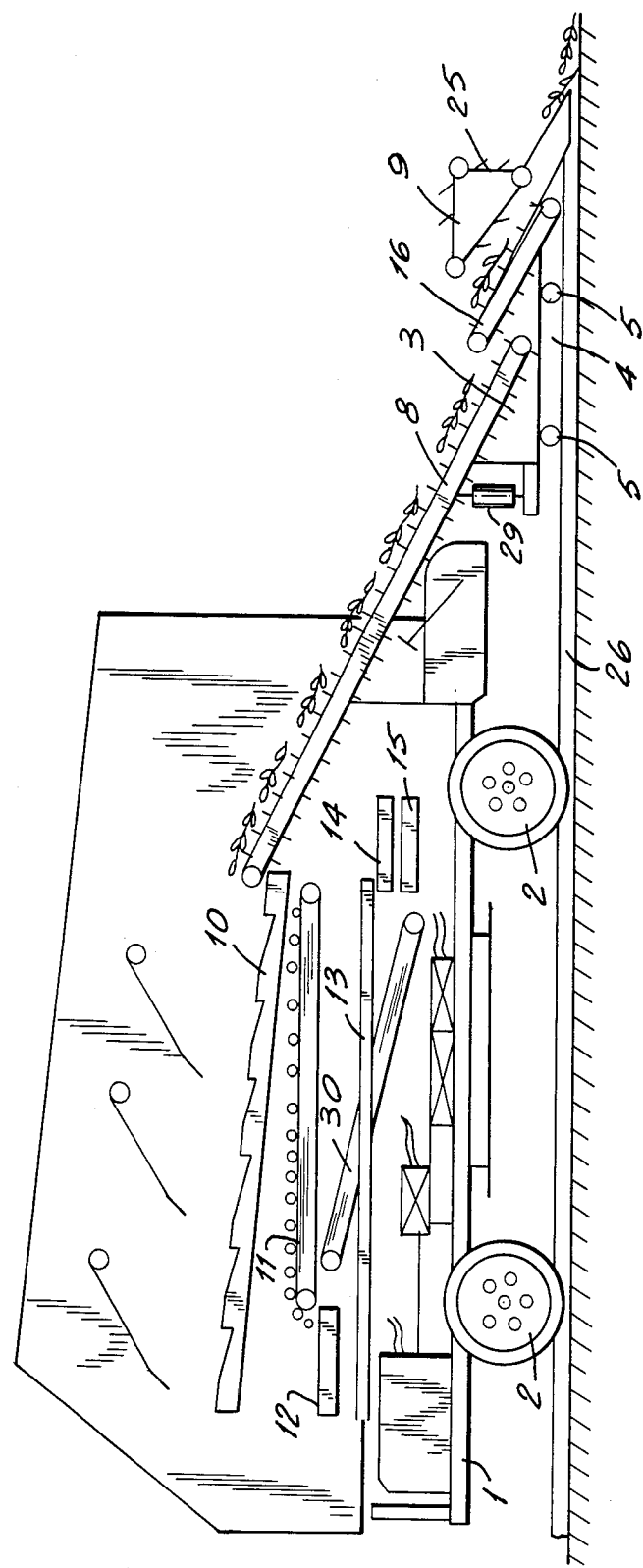
FIG. 1 is a side view of the machine.

Referring to FIG. 1 the tomato picking device comprises a support frame 1 placed on wheels 2. An inclinded vibrating conveyor 8 is articulately fastened to the front part of support frame 1. A ground level copying device 4 is placed below the conveyor 8. A picker 9 with spikes 25 is fastened above the front part of the conveyor 8. A cutting device 7 (see FIG. 2) is fastened in front of the picker 9.

Below the upper part of conveyor 8 there is a tomato separator 10. A waste product cleaning conveyor 11 is mounted below the tomato separator 10. Conveyor 11 is operatively connected with separating conveyors 12 which are placed crosswise to the machine (see FIG. 2). The outer ends of conveyors 12 lie above lengthwise conveyors 13 which are on both sides of the tomato picking machine and are operatively connected with and placed in succession with crosswise picking conveyor 14 and side moving rake conveyor 15. Between the picker 9 with spikes 25 and the inclined vibrating conveyor 8, a short receiving conveyor 16 is mounted parallel to inclined vibrating conveyor 8.

The ground level copying device 4 (see FIG. 3) is placed just behind the cutting device 7 (see FIG. 2) and lies on the surface 26 of the processed bed so that it centers the inclined frame and the blades. Generally, the cutting device will operate 2-5 cm under the surface earth layer with the bed being highly lifted and levelled.

The vibrating inclinded conveyor 8 and the waste product cleaning conveyor 11 comprise endless, lengthwise chains 17 (see FIGS. 5 and 6) crosswise tube type supports 20 and smooth, tube type rollers 22 respectively.

Figure 2:
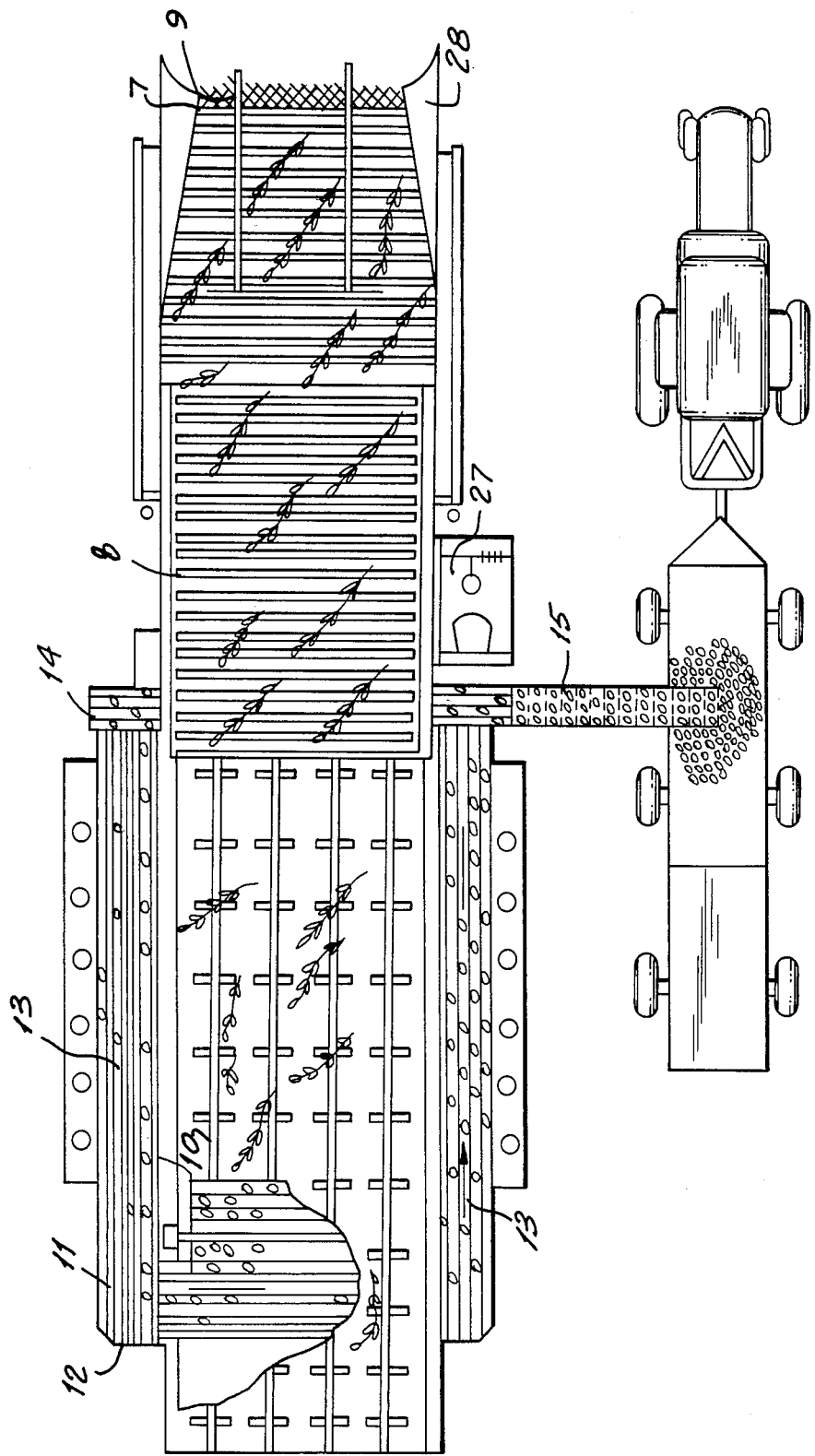
FIG. 2 is a top view of the machine.

The lengthwise conveyor 13, separating conveyors 12, and crosswise picking conveyor 14 are all of the belt and self-cleaning type (see FIG. 2).

The cutting device 7 (see FIG. 2) is a vibrating one and has two comb-like blades placed perpendicular to the longitudinal axis of the machine.

The ground level copying device 4 (see FIGS. 1, 3, and 4) comprises an additional frame 3, its front part being articulately mounted to the inclinded vibrating conveyor 8 while its back part is fastened by means of hydro-cylinders 29 to the inclinded vibrating conveyor 8. Axes 5 are perpendicular to the axis of the bed and are mounted by means of bearings to frame 3. Above said axes, self cleaning wheels 6 are placed in close succession by means of bearings.

Figure 5:
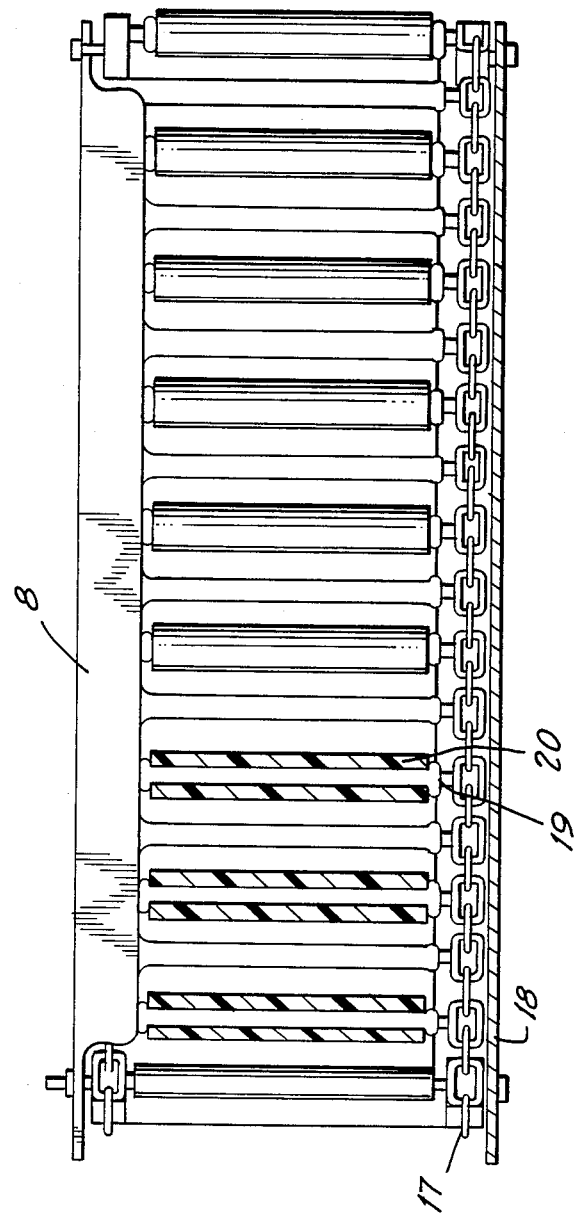
FIG. 5 is a top view of the inclined vibrating conveyor.

Referring to FIG. 5, the horizontal loops 18 of the endless chains 17 of conveyor 8 are rigidly fastened to planks 19. Planks 19 easily enter the narrowed end of tube type supports 20 in such a way that they do not rotate. In this way, they act as vibrating supports for the transported tomatoes.

Referring to FIGS. 6 and 7, pilots 21 are rigidly fastened to horizontal loops 18 of the endless chain 17 of the waste product cleaning conveyor 11. Smooth, tube type rollers 22 are coated with rubber 23 and are placed above said pilots by means of bearings. The smooth, tube type rollers 22 also lie on lengthwise brackets 24.

Referring to FIGS. 1 and 2, the speed of the short receiving conveyor 16 is two to three times greater than the speed of picker 9. The necessary generating equipment for starting the machine's units into motion is placed on the support frame 1. The operator's control board 27 is adjacent to the side moving rake conveyor 15. Leaf lifters 28 are used at the front part of the machine to achieve a better gathering of leaves and stems. An inclined depositing belt 30 is fixed under the waste product cleaning conveyor 11.

Method of Operation

The tomato picking machine operates as follows;

The ground level copying device 4 is set into motion by means of hydro-cylinders 29 from the control board 27, thus the depth of cutting device 7 is also controlled. When moving ahead, the leaf lifting device 28 lifts and selects tomato plants. During the process of cutting the root system, a crushing down of earth lumps occurs. In this way, most of the soil remains above the bed surface 26. The cut plants are fed to the inclinded vibrating conveyor 8 by means of the short conveyor 16 and picker 9. The short receiving conveyor 16 moves with the speed of two to three times greater than the speed of picker 9. Picker 9 has spikes 25 which change into the direction of the cutting plants, thus insuring a constant feeding of cut plants. The greater part of the soil that sticks to the tomato plant stems is separated on the inclinded vibrating conveyor 8. Conveyor 8 delivers a stack of tomatoes and plants which fall onto tomato separator 10 wherein the separating of plants from tomatoes occurs. The tomatoes fall onto the waste product cleaning conveyor 11. Due to the rotation of tube type rollers 22, good tomatoes are selected from squashed or rotten tomatoes. Separation of small plant remnants also takes place. The next selection occurs on the lengthwise conveyors 13, separating conveyors 12 and crosswise picking conveyor 14. This is possible since all of these conveyors are the belt type. The undersized tomatoes fall between the belts while the standard size tomatoes which do not fall between the belts are fed to containers placed on a vehicle moving alongside the machine (see FIG. 2). The remaining squashed tomatoes and impurities fall onto depositing belt 30 by means of which they are returned to the processed bed surface 26.

We claim:

1. A tomato picking machine comprising
   a support frame with a front part;
   an inclined vibrating conveyor articulately fastened to the front part of the support frame; said vibrating conveyor having an upper and lower part; the lower part of said vibrating conveyor being mounted on
   a ground level copying device;
   a picker placed above said copying device and mounted behind
   a cutting device being situated at the lowest part of said inclined vibrating conveyor; said picker having articulately mounted spikes which rotate in one direction only;
   a tomato separator placed above the highest part of the inclined vibrating conveyor;
   a waste product cleaning conveyor mounted under said tomato separator; said cleaning conveyor operatively connected with separating conveyors;
   said separating conveyors being placed crosswise to the machine; the outer ends of said separating conveyors lying above lengthwise conveyors;
   said lengthwise conveyors being situated on opposite sides of the machine and operatively connected with a picking conveyor;

said picking conveyor being mounted crosswise to the machine and operatively connected to a moving rake conveyor;

a short receiving conveyor is mounted between the picker and the inclined vibrating conveyor parallel to the inclined vibrating conveyor;

the ground copying device is placed immediately behind the cutting device and lies on the processed bed;

the vibrating inclined conveyor and cleaning conveyor are made of endless chains placed lengthwise to the machine;

the vibrating inclined conveyor comprises tube type supports, which the cleaning conveyor comprises smooth tube type rollers;

lengthwise conveyors, separating conveyors, and crosswise gathering conveyors are all of the belt type and self-cleaning;

the cutting device vibrates and has two comb-like blades placed perpendicular to the longitudinal axis of the machine wherein the ground level copying device comprises a separate second frame; said second frame having a front end and a back end; said second frame being articulately mounted at its front end to the lower part of the inclined vibrating conveyor, while the back end of said second frame is mounted to the inclined vibrating conveyor by means of hydro-cylinders; said second frame having two axes, each axis provided with self cleaning wheels mounted close to one another so that the cleaning device centers the inclined vibrating conveyor and the cutting device.

* * * * *